(12) United States Patent
Kirner et al.

(10) Patent No.: US 7,575,204 B2
(45) Date of Patent: Aug. 18, 2009

(54) ARRANGEMENT FOR CONNECTING A DEVICE'S FRONT PANEL

(75) Inventors: Herbert Kirner, Villingen-Schwenningen (DE); Juergen Paucker, Villingen-Schwenningen (DE)

(73) Assignee: Siemens Aktiengesellschaft, Munich (DE)

( * ) Notice: Subject to any disclaimer, the term of this patent is extended or adjusted under 35 U.S.C. 154(b) by 825 days.

(21) Appl. No.: 10/739,053

(22) Filed: Mar. 15, 2004

(65) Prior Publication Data

US 2006/0201073 A1    Sep. 14, 2006

Related U.S. Application Data

(63) Continuation of application No. PCT/DE02/02083, filed on Jun. 7, 2002.

(30) Foreign Application Priority Data

Jun. 30, 2001    (DE) ................. 201 10 888 U

(51) Int. Cl.
*G12B 9/00* (2006.01)

(52) U.S. Cl. ............. 248/27.3; 248/27.1; 361/679; 361/680; 361/681; 361/682; 361/683; 312/223.1; 312/223.2

(58) Field of Classification Search ........ 248/27.1, 248/27.3; 361/679–683; 312/223.1, 223.2
See application file for complete search history.

(56) References Cited

U.S. PATENT DOCUMENTS

| 3,231,225 | A | * | 1/1966 | Bakke ................ 248/27.1 |
| 4,245,872 | A | * | 1/1981 | Kakigi ................ 312/242 |
| 4,562,595 | A | * | 12/1985 | Bauer et al. ........... 455/345 |
| 4,699,341 | A | * | 10/1987 | Ponticelli ............. 248/27.1 |
| 4,784,357 | A | * | 11/1988 | Kimura ............... 248/27.1 |
| 4,784,361 | A | * | 11/1988 | Kobayashi et al. ........ 248/551 |
| 4,829,595 | A | * | 5/1989 | Kobayashi et al. ........ 455/346 |
| 4,913,384 | A | * | 4/1990 | Inamura .............. 248/27.3 |
| 5,004,634 | A | * | 4/1991 | Anthony .............. 428/31 |
| 5,245,511 | A | * | 9/1993 | Watanabe ............. 361/814 |
| 5,307,327 | A | * | 4/1994 | Green et al. ............ 369/12 |

(Continued)

FOREIGN PATENT DOCUMENTS

EP    0333579 A1    9/1989

(Continued)

OTHER PUBLICATIONS

Derwent Abstract—FR 2675746; Oct. 30, 1992; SA D'Applicants Generales D'Electricite et de Mecanique Sagem; France.

(Continued)

*Primary Examiner*—J. Allen Shriver, II
*Assistant Examiner*—Michael McDuffie
(74) *Attorney, Agent, or Firm*—Cohen Pontani Lieberman & Pavane LLP

(57) ABSTRACT

According to the invention, several outward-projecting tongues are formed on the built-in housing part of a parallel-epipedal built-in unit and a frame whose inner width is greater than the mounting dimension of the built-in housing, is configured on the front panel that is to be fixed on the built-in housing part. Grooves which are allocated to the tongues and corresponding sliding surfaces are formed on the interior of the frame, the grooves and surfaces cooperating with certain elasticity in the frame to form a one-way snap-on connection.

19 Claims, 3 Drawing Sheets

U.S. PATENT DOCUMENTS

| | | | |
|---|---|---|---|
| 5,423,805 A | | 6/1995 | Brucker et al. |
| 5,467,947 A | * | 11/1995 | Quilling, II .................. 248/27.1 |
| 5,610,376 A | * | 3/1997 | Takagi et al. ............. 200/50.01 |
| 5,637,928 A | * | 6/1997 | Nakajima et al. .......... 307/10.2 |
| 5,779,197 A | * | 7/1998 | Kim .......................... 248/27.1 |
| 5,863,106 A | * | 1/1999 | Beak ........................... 312/7.2 |
| 5,967,633 A | * | 10/1999 | Jung ........................ 312/223.2 |
| 5,979,836 A | * | 11/1999 | Kim ........................... 248/27.3 |
| 6,157,532 A | * | 12/2000 | Cook et al. ................. 361/681 |
| 6,283,417 B1 | * | 9/2001 | Ikunami ..................... 248/27.3 |
| 6,288,902 B1 | * | 9/2001 | Kim et al. ................... 361/725 |
| 6,305,648 B1 | * | 10/2001 | Liu et al. .................... 248/27.1 |
| 6,337,793 B1 | * | 1/2002 | Vier et al. ................... 361/683 |
| 6,356,436 B1 | * | 3/2002 | Buican et al. ............... 361/683 |
| 6,396,686 B1 | * | 5/2002 | Liu et al. .................... 361/685 |
| 6,847,521 B2 | * | 1/2005 | Beall et al. .................. 361/682 |

FOREIGN PATENT DOCUMENTS

| | | |
|---|---|---|
| EP | 0984674 A1 | 3/2000 |
| EP | 1045628 A2 | 10/2000 |
| FR | 1506504 | 12/1967 |
| FR | 2675746 | 10/1992 |
| JP | 03017675 A | 1/1991 |
| JP | 2001160697 A | 6/2001 |

OTHER PUBLICATIONS

Derwent Abstract—EP0984674A1; Mar. 8, 2000; Siemens AG, D-80333 München.

Derwent Abstract—EP1045628A2; Oct. 18, 2000; Mannesmann VDO AG, D-60388 Frankfurt am Main.

Derwent Abstract—FR1506504; Dec. 22, 1967; Etablissements Ed. Jaeger S.A., France.

* cited by examiner

ARRANGEMENT FOR CONNECTING A DEVICE'S FRONT PANEL

CROSS-REFERENCE TO RELATED APPLICATIONS

The present application is a continuation of international application PCT/DE01/02083, filed Jun. 7, 2001 and which designated the United States, and claims priority to German application 20110888.7, filed Jun. 30, 2001, the both of which are herein incorporated by reference.

BACKGROUND OF THE INVENTION

The invention relates to means for connecting a front panel of a parallelepiped built-in unit to a built-in housing, the front panel being assigned to a narrow side of the built-in housing.

If the abovementioned built-in unit is a tachograph used in a motor vehicle, then the front panel thereof, in addition to satisfying esthetic requirements, also constitutes a functional part. To better serve the functionality, a window cut-out for a display, button shafts and guide slots assigned to the data cards of the driver and passenger, and possibly also a discharge slot for a printout are provided.

The connecting means between the front panel and the built-in housing of such a tachograph have to have a high level of positioning accuracy in relation to the subassemblies arranged in the built-in housing, i.e. the display, various buttons, a printing unit and the data-card assemblies. Additionally, the connecting means have to avoid changes in position as a result of material fatigue on account of vibrations which are inevitable during operation of a motor vehicle and on account of the fluctuations in temperature which prevail at the installation location. On the other hand, the recordings of tachographs, in particular the recordings relating to the working and rest periods, are at risk of manipulation, with the result that it has to be ensured that tampering which cannot be subsequently detected, for example through a gap between the front panel and built-in housing, is reliably prevented.

Quite apart from the fact that they are not suitable for mass production on account of the outlay in respect of components and installation, it is also the case that conventional screw connections secured by lead seals do not fulfill these conditions, inter alia, because the amount of installation space which is necessary for fitting a plurality of screw connections on the front side is not available and, as experience has shown, the lead-seal caps which secure the screws do not perform a reliable sealing function. In contrast, hooks or claws integrally formed on the front panel, in order to be sufficiently resilient for a latching connection between the front panel and the built-in housing, require a certain length and amount of free space. In addition to the risk of such connecting means breaking, this type of fastening is tolerance-critical, with the result that a front panel, in some circumstances, cannot be installed or an unstable connection which is no longer free of play is possibly established over time on account of vibrations and extreme change in temperature.

SUMMARY OF THE INVENTION

Objects of the present invention include providing a connection means: which allows the front panel of a parallelepipedal tachograph to be installed on the built-in housing in a manner which is compatible with mass production; which is resilient against tampering; which is functional and maintains its integrity in a motor vehicle and such type environment; and which lends itself to straightforward engineering and production. Of course, the present objects and invention do not apply solely to tachographs.

These and related objects are achieved by a frame which is formed on the front panel. The clear width of this frame is greater than the installation dimensions of the built-in housing. Outwardly oriented tongues/tabs are integrally formed at least on two opposite wall elements of the built-in housing essentially at right angles to the respective wall plane. Grooves assigned to the tongues/tabs are formed in the frame.

The solution according to the invention provides an advantage of a one-way snap-in connection which is quick to install, ensures that the front panel is seated permanently on the built-in housing, and, in the case of which preferably the entire front panel is included in the necessary elastic deformation, the relatively long sliding surfaces provided allowing the frame to expand during installation of the front panel. Removal of the front panel without damage or destruction is only possible using a specific tool.

Accordingly, with the connection according to the invention, a sealing function without additional components being necessary results. On the other hand, tampering is prevented because the frame covers over the connecting means to a relatively great extent and the location of the connecting means, i.e. the tongues/tabs and the grooves assigned to the tongues/tabs on the inside of the frame is not visible from the outside. It has further been noted that the connection according to the invention is largely free of forces in the installed state and thus ensures dimensional stability for the front panel. The front panel may be produced from plastic.

BRIEF DESCRIPTION OF THE SEVERAL VIEWS OF THE DRAWINGS

The invention is explained in more detail hereinbelow with reference to drawings, in which.

DETAILED DESCRIPTION OF THE INVENTION

Figure 1:
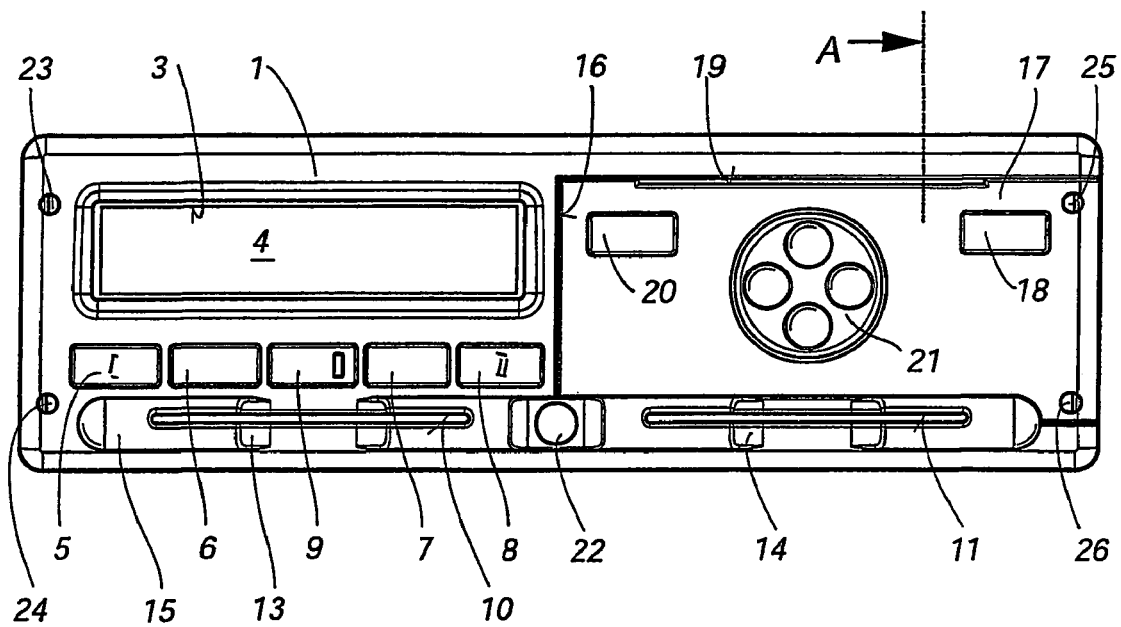
FIG. 1 shows a front view of a tachograph.

In FIG. 1, 1 designates a front panel which closes off a built-in housing 2 (FIGS. 2 and 3) of a tachograph on the front side. 3 designates a window cut-out through which it is possible to read a display 4. Furthermore, a plurality of buttons 5, 6, 7 and 8 are guided in the front panel 1. In this case, the buttons 5 and 7 serve for the task of the driver and passenger logging on, and the buttons 6 and 7 serve for releasing the respective data cards assigned to the driver and passenger. A covering 9 closes a plug socket used for diagnostic purposes. Guide slots 10 and 11 which are countersunk in a funnel-like manner serve for the introduction of the driver's data card into the respective reading/writing assemblies of the tachograph, these being located in the built-in housing 2 and preferably being assigned to a printed circuit board 12 (FIG. 3). Recesses 13 and 14 of the bead-like protrusion 15 of the front panel 1 serve for access for the purpose of removing a data card. The front panel 1 further contains a cut-out 16 which is covered by a. front wall 17 of a drawer assigned to a printing device, to be precise such that the front wall 17 is incorporated in terms of design, in particular in a surface-flush manner, in the front surface of the front panel 1.

Merely for the sake of completeness, it should be mentioned that the drawer is assigned connecting means which, in the case where recording material is to be refilled, can be unlocked by confirmation of a button 18. 19 designates an outlet opening for the printed recording material A button 20 serves for initiating printing. By means of a rocker switch 21 which is likewise arranged in the drawer, it is possible to select various functions and memories and, for example in conjunction with the buttons 5 and 8, to enquire the working-period data of the driver and passenger. 22 designates a lead-seal cap which is assigned to a screw which connects the front panel 1 to the built-in housing 2. Pairs of openings 263,24, 25 and 26 serve for the introduction of clamp-like tools for removing a tachograph from an installation compartment or a suitable opening in an instrument panel In this case, the legs of the clamps, as can be gathered from FIG. 2, interact with resilient claws 27 and 28 which are formed on u-shaped components 29 which, for their part, are fastened on the side walls 30 and 31 of the built-in housing 2 by means of screws 32 and 33.

The built-in housing 2, which according to FIG. 3 is only partly fitted out, comprises a cover part 34 and a base part 35. The cover part 34 has a cover plate 36, on which the side walls 30, 31 and a rear wall 37 are integrally formed. The base part 35 is formed by a base plate 38 and by legs which are integrally formed on the base plate 38 and are assigned in an overlapping manner to the side walls 30, 31 and the rear wall 37 of the cover part 34, one leg being designated 39. Tabs 40 and 41, which are bent out of the side walls, and catches 42 and 43, which are integrally formed on the legs, are used to join the cover part 34 and base part 35 together in a bayonet-like manner. Moreover, the tabs 40, 41 form platforms which are used for fastening the printed circuit board 12. The built-in housing 2, furthermore, is assigned a structural part 44 which, on the one hand, serves for stiffening purposes by being connected to a side wall 31 of the rear wall 37, the base plate 38, the cover plate 36 and the printed circuit board 12 and, on the other hand, forms a securing means for the display 4 or for a display subassembly, comprising the display 4, a printed circuit board assigned to the display 4, and the buttons 5, 6, 7 and 8, and on which is integrally formed a guide rail which is assigned to the drawer of the printing device. The second guide rail of the drawer is fastened on the side wall 30. 45 designates a plug connector which symbolically illustrates the positioning of the display subassembly in relation to the printed circuit board 12. 46 constitutes a support which is formed on the structural part 44, engages through the printed circuit board 12 and interacts with the base plate 38.

As can further be seen from FIG. 3, stiffening strips 47 and 48 with tongues 49, 50, 51 and 52, 53 formed thereon are integrally formed on those end sides of the cover plate 36 and base plate 38 which are directed toward the front panel 1. Bent tabs 54 and 55 are located at the ends of the side walls 30, 31 of the cover part 34, preferably in the same plane as the tongues 49, 50, 51, 52, 53. Two angled elements 56, 57 which are formed from the side walls 30, 31 serve as stops during the installation of the tachograph. A lug which is integrally formed on the base plate 38, and is designated 58, is used in the operation of fitting the abovementioned screw secured by the lead-seal cap 22.

Figure 2:
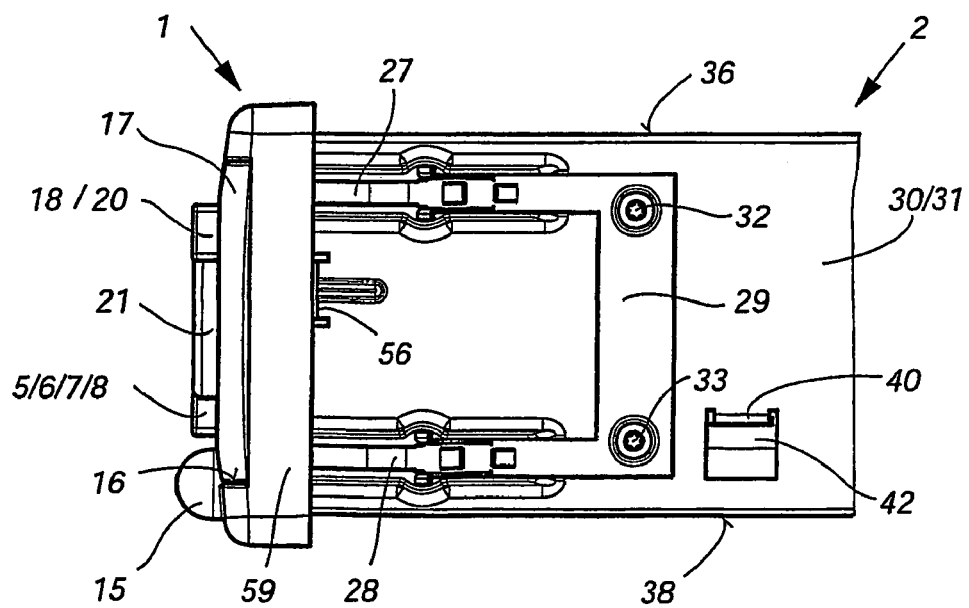
FIG. 2 shows an enlarged partial illustration of a side view of the tachograph according to FIG. 1.
Figure 3:
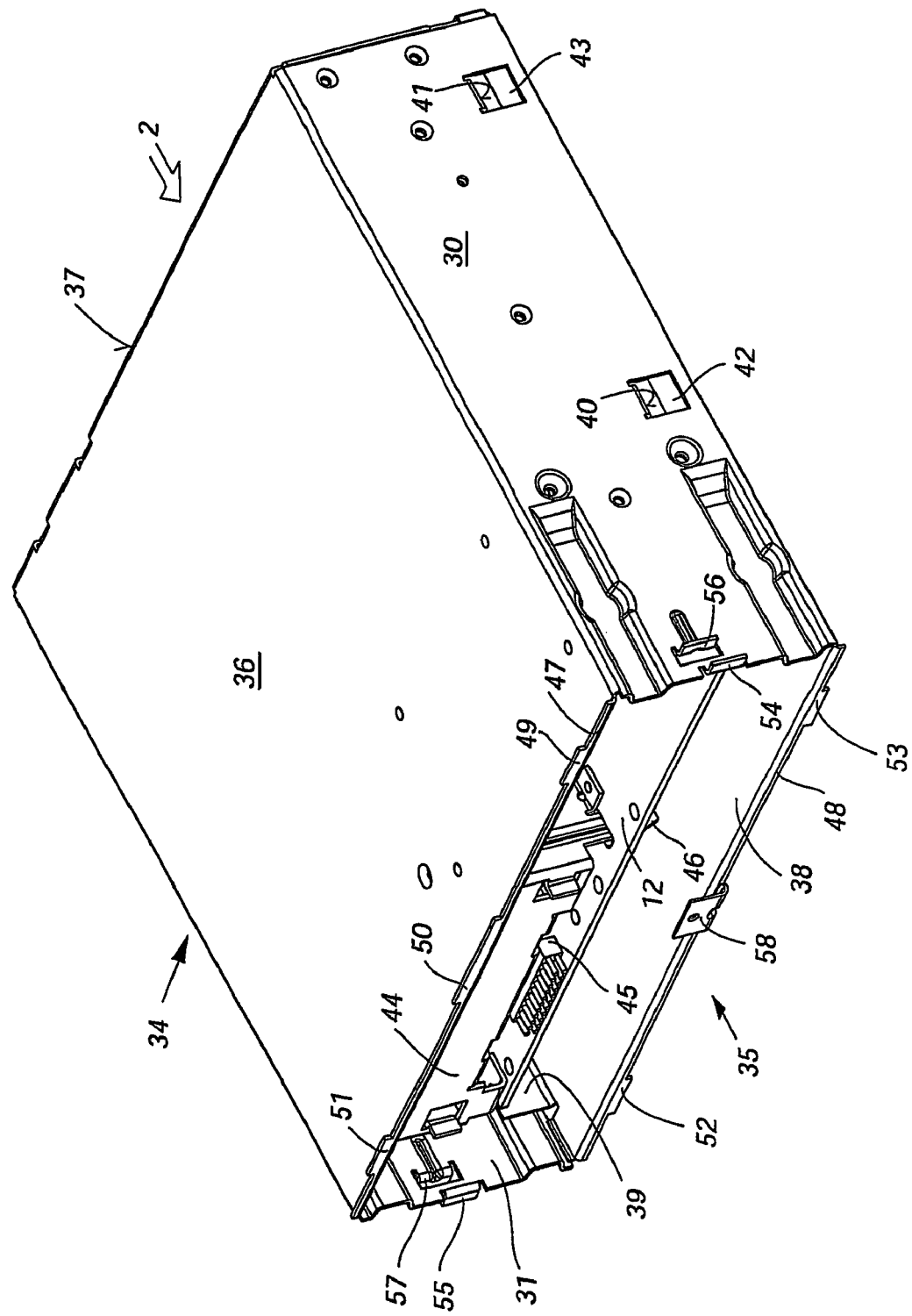
FIG. 3 shows a perspective illustration of the built-in housing of the tachograph according to the invention.
Figure 4:
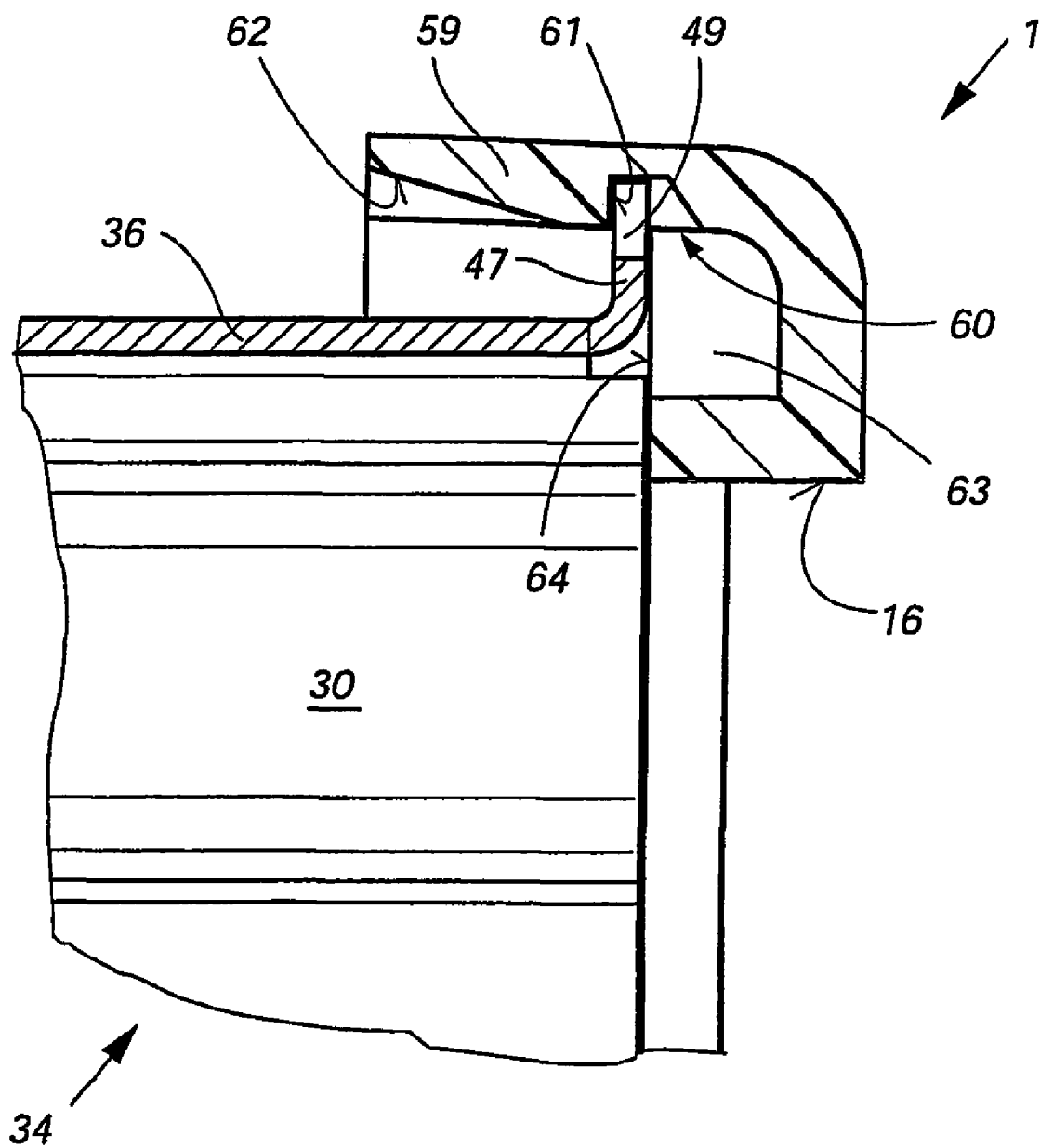
FIG. 4 shows a partial section along section line A in FIG. 1 with the printer drawer removed.

The partial section illustrated by FIG. 4 and the side view in FIG. 2 show that a peripheral frame 59 which is integrally formed on the front panel 1 engages over the built-in housing 2 to a relatively great extent and thus covers the regions where the connecting means between the front panel 1 and the built-in housing 2 are located, these connecting means being rendered inaccessible. The tongues 49, 50, 51, 52, 53 and the tabs 54, 55 are each assigned grooves 60 which are formed in the frame 59 and of which the locking flanks 61, corresponding to the tongues and tabs, are located in one or different planes and are formed essentially at right angles to the direction of installation of the front panel 1. 62 designates sliding surfaces which are respectively assigned to each groove 60. A plurality of ribs 63, which stiffen the front panel 1, are designed such that their end surfaces 64 are located in the front plane of the strips 47, 48, possibly also the side walls 30, 31, and serve as stop during installation of the front panel 1. It should also be mentioned that the flanks 61 may also be formed such that they are not at right angles to the direction of installation of the front panel 1, whereby, in one case, removal of the front panel 1 would be facilitated and in the other case, e.g. with undercut grooves 60, removal would be made more difficult and the sealing function would be enhanced.

We claim:

1. An arrangement for connecting a front outer panel of a device, comprising: a housing for accommodating said device therein, said housing including walls defining an internal cavity and front opening, said front opening defining a perimeter; and a number of elevated tabs affixed to and extending away from said perimeter at substantially right angles; wherein said front outer panel comprises a frame, said frame being wider than said perimeter and comprising a number of grooves for accommodating said tabs, said grooves being sized to mate with said tabs, wherein said perimeter includes a top and a bottom wall extending at substantially right angles away from said perimeter, wherein said tabs are affixed to said top wall and said bottom wall and wherein said housing is configured to retain the device at a location within, and the device and the front outer panel mate at a mating plane offset inwardly from a plane of the outer perimeter of the front outer panel.

2. An arrangement for connecting a front panel of a device, comprising:
   a housing for accommodating said device therein, said housing including walls defining an internal cavity and front opening, said front opening defining a perimeter; and
   a number of elevated tabs affixed to and extending away from said perimeter at substantially right angles;
   wherein said panel comprises a frame, said frame being wider than said perimeter and comprising a number of grooves for accommodating said tabs, said grooves being sized to mate with said tabs, wherein said perimeter includes a top and a bottom wall extending at substantially right angles way from said perimeter, wherein said frame includes a number of sliding surfaces located proximate to said grooves so as to facilitate accommodating of said tabs within said grooves, and wherein said sliding surfaces are upstream from said grooves in an installation direction.

3. An arrangement for connecting a front panel of a device, comprising:
   a housing for accommodating said device therein, said housing including walls defining an internal cavity and front opening, said front opening defining a perimeter; and
   a number of elevated tabs affixed to and extending away from said perimeter at substantially right angles;
   wherein said panel comprises a frame, said frame being wider than said perimeter and comprising a number of grooves for accommodating said tabs, said grooves being sized to mate with said tabs, wherein said panel further comprises a number of front openings for accommodating an elongated clamp therein, said openings providing access to locking members for locking said device within said housing, wherein said locking members comprise a U shaped component, said housing comprises a number of component grooves equal to a number of U shaped components, and said U shaped components are accommodated within said component grooves when said device is locked within said housing.

4. The arrangement of claim 3, wherein said number of grooves equals said number of elevated tabs.

5. The arrangement of claim 3, wherein said perimeter includes a top and a bottom wall extending at substantially right angles away from said perimeter.

6. The arrangement of claim 5, wherein said tabs are affixed to said top wall and said bottom wall.

7. The arrangement of claim 5, wherein said frame includes a number of sliding surfaces located proximate to said grooves so as to facilitate accommodating of said tabs within said grooves.

8. The arrangement of claim 7, wherein said sliding surfaces are upstream from said grooves in an installation direction.

9. The arrangement of claim 3, wherein said housing comprises metal and said tabs comprise plastic.

10. The arrangement of claim 3, wherein said tabs further comprise locking flanks arranged at substantially right angles to an installation direction, said flanks facilitating locking of said frame to said housing via said tabs.

11. The arrangement of claim 2, wherein said number of grooves equals said number of elevated tabs.

12. The arrangement of claim 2, wherein said tabs are affixed to said top wall and said bottom wall.

13. The arrangement of claim 2, wherein said housing comprises metal and said tabs comprise plastic.

14. The arrangement of claim 2, wherein said tabs further comprise locking flanks arranged at substantially right angles to an installation direction, said flanks facilitating locking of said frame to said housing via said tabs.

15. The arrangement of claim 1, wherein said number of grooves equals said number of elevated tabs.

16. The arrangement of claim 1, wherein said frame includes a number of sliding surfaces located proximate to said grooves so as to facilitate accommodating of said tabs within said grooves.

17. An arrangement for connecting a front panel of a device, comprising:
  a housing for accommodating said device therein, said housing including walls defining an internal cavity and front opening, said, front opening defining a perimeter; and
  a number of elevated tabs affixed to and extending away from said perimeter at substantially right angles;
  wherein said panel comprises a frame, said frame being wider than said perimeter and comprising a number of grooves for accommodating said tabs, said grooves being sized to mate with said tabs, wherein said perimeter includes a top and a bottom wail extending at substantially right angles away from said perimeter, wherein said tabs are affixed to said top wall and said bottom wall, wherein said sliding surfaces are upstream from said grooves in an installation direction.

18. The arrangement of claim 1, wherein said housing comprises metal and said tabs comprise plastic.

19. The arrangement of claim 1, wherein said tabs further comprise locking flanks arranged at substantially right angles to an installation direction, said flanks facilitating locking of said frame to said housing via said tabs.

* * * * *